United States Patent
Liu (10) Patent No.: US 11,917,562 B2
(45) Date of Patent: Feb. 27, 2024

(54) VEHICLE-TO-EVERYTHING SYNCHRONIZATION METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 463 days.

(21) Appl. No.: 17/277,727

(22) PCT Filed: Sep. 20, 2018

(86) PCT No.: PCT/CN2018/106711
§ 371 (c)(1),
(2) Date: Mar. 18, 2021

(87) PCT Pub. No.: WO2020/056667
PCT Pub. Date: Mar. 26, 2020

(65) Prior Publication Data
US 2021/0352600 A1 Nov. 11, 2021

(51) Int. Cl.
*H04W 56/00* (2009.01)
*H04W 4/40* (2018.01)
(Continued)

(52) U.S. Cl.
CPC ......... *H04W 56/001* (2013.01); *H04L 5/0053* (2013.01); *H04W 4/40* (2018.02); *H04W 24/08* (2013.01); *G04R 20/02* (2013.01)

(58) Field of Classification Search
CPC ...... H04W 56/001; H04W 4/40; H04W 24/08
See application file for complete search history.

(56) References Cited

U.S. PATENT DOCUMENTS

2008/0037577 A1* 2/2008 Nagura .............. H04L 1/20
370/445
2011/0205943 A1* 8/2011 Grimm ............. H04L 1/0003
370/310
(Continued)

FOREIGN PATENT DOCUMENTS

CA 2845295 A 9/2014
CN 104303448 A 1/2015
(Continued)

OTHER PUBLICATIONS

European Patent Office, Extended European Search Report Issued in Application No. 18934208.2, dated Aug. 19, 2021, Germany, (9p).
(Continued)

*Primary Examiner* — Zhiren Qin
(74) *Attorney, Agent, or Firm* — Arch & Lake LLP (57) ABSTRACT

Methods and apparatuses are provided for Vehicle-to-Everything synchronization for a first terminal. The method is implemented by the first terminal and includes: determining a transmission period for transmitting the sidelink synchronization signal under a first network signal condition as a first period; in response to that a second network signal condition is detected, adjusting the transmission period for transmitting the sidelink synchronization signal based on a set rule to obtain a second period after the adjustment, where the second network signal condition is different from the first network signal condition, and the second period is different from the first period; and transmitting the sidelink synchronization signal to one or more second terminals according to the second period, for a Vehicle-to-Everything synchronization by the one or more second terminals based on the received sidelink synchronization signal, where the one or more second terminals are respective receiving ends for the sidelink synchronization signal.

20 Claims, 6 Drawing Sheets

(51) Int. Cl.
  *H04L 5/00* (2006.01)
  *H04W 24/08* (2009.01)
  *G04R 20/02* (2013.01)

(56) References Cited

U.S. PATENT DOCUMENTS

| | | | |
|---|---|---|---|
| 2014/0003257 A1* | 1/2014 | Chin | H04W 52/0261 |
| | | | 370/252 |
| 2014/0254480 A1 | 9/2014 | Huus et al. | |
| 2015/0078369 A1 | 3/2015 | Khude et al. | |
| 2015/0123847 A1* | 5/2015 | Farmer | G01S 19/34 |
| | | | 342/357.74 |
| 2018/0249476 A1* | 8/2018 | Miao | H04W 72/0446 |
| 2019/0037513 A1* | 1/2019 | Yang | H04W 56/002 |
| 2019/0045507 A1* | 2/2019 | Sorrentino | H04W 72/1268 |
| 2020/0045660 A1* | 2/2020 | Lee | H04W 72/20 |
| 2020/0154384 A1* | 5/2020 | Chae | H04W 76/14 |
| 2020/0296557 A1* | 9/2020 | Lee | H04W 4/40 |
| 2020/0367096 A1* | 11/2020 | Hwang | H04W 74/0808 |
| 2021/0185628 A1* | 6/2021 | Huang | G01S 19/05 |

FOREIGN PATENT DOCUMENTS

| | | |
|---|---|---|
| CN | 107027105 A | 8/2017 |
| CN | 107347215 A | 11/2017 |
| CN | 108112036 A | 6/2018 |
| CN | 108243390 A | 7/2018 |
| DE | 112019004017 T5 | 4/2021 |
| EP | 3322234 A1 | 5/2018 |
| EP | 3337253 A1 | 6/2018 |
| GB | 2590229 A | 6/2021 |
| TW | 201824916 A | 7/2018 |
| WO | 2018062850 A1 | 4/2018 |

OTHER PUBLICATIONS

ISA State Intellectual Property Office of the People's Republic of China, Written Opinion of the International Searching Authority Issued in Application No. PCT/CN2018/106711, dated Apr. 28, 2019, WIPO, (8p).
Intel Corporation, "Discussion on V2X RRM Core requirements", 3GPP TSG-RAN WG4 Meeting #81 Reno, Nevada, USA, R4-1610173, Nov. 14-18, 2016, (6p).
International Search Report issued in PCT Application No. PCT/CN2018/106711, dated Apr. 28, 2019, (4p).
First Office Action and Search Report Issued in Chinese Application No. 201880001888.7, dated May 7, 2019 with English translation, (10p).
Intellectual property India, Office Action Issued in Application No. 202147016908, dated Feb. 8, 2022, (6 pages). (Submitted with Partial Machine Translation).

* cited by examiner

VEHICLE-TO-EVERYTHING SYNCHRONIZATION METHOD AND DEVICE

CROSS-REFERENCE TO RELATED APPLICATION

This application is the national phase of International Application No. PCT/CN2018/106711, filed on Sep. 20, 2018, the disclosure of which is incorporated herein by reference in its entirety for all purposes.

TECHNICAL FIELD

The present disclosure relates to the field of communication technologies, and in particular, relates to methods and apparatuses for Vehicle-to-Everything synchronization.

BACKGROUND

Vehicle-to-Everything (V2X) communication may involve Vehicle-to-Vehicle (V2V) communication, Vehicle-to-Infrastructure (V2I) communication, Vehicle-to-Pedestrian (V2P) communication, and the like. In prior art, the V2X communication may be supported by utilizing current cellular communication technologies, that is, the communication may be performed through a communication link between a terminal device and a base station in an existing cellular network. Alternatively, the communication may be performed directly through a direct link between the devices. However, based on Long Term Evolution (LTE), the supported V2X communication is only limited to a few basic V2X applications concerning security issues. Therefore, New Radio (NR) is expected to enable the V2X communication with higher communication rates, shorter communication delays, and more reliable communication quality, so as to support new V2X services and meet new V2X technical requirements.

SUMMARY

In order to address one or more problems in related arts, the present disclosure provide methods and apparatuses for Vehicle-to-Everything synchronization.

According to a first aspect of the present disclosure, there is provided a method of Vehicle-to-Everything synchronization for a first terminal, the first terminal being a transmitting end for a sidelink synchronization signal. The method includes: determining a transmission period for transmitting the sidelink synchronization signal under a first network signal condition as a first period; in response to that a second network signal condition is detected, adjusting the transmission period for transmitting the sidelink synchronization signal based on a set rule to obtain a second period after the adjustment, where the second network signal condition is different from the first network signal condition, and the second period is different from the first period; and transmitting the sidelink synchronization signal to one or more second terminals according to the second period, for a Vehicle-to-Everything synchronization by the one or more second terminals based on the received sidelink synchronization signal, where the one or more second terminals are respective receiving ends for the sidelink synchronization signal and are to be synchronized with the first terminal.

According to a second aspect of the present disclosure, there is provided a non-transitory computer-readable storage medium having a computer program stored thereon, where the computer program is configured to perform the method of Vehicle-to-Everything synchronization according to the first aspect.

According to a third aspect of the present disclosure, there is provided an apparatus for Vehicle-to-Everything synchronization for a first terminal, the first terminal being a transmitting end for a sidelink synchronization signal. The apparatus includes: a processor; and a memory for storing instructions executable by the processor.

The processor is configured to: determine a transmission period for transmitting the sidelink synchronization signal under a first network signal condition as a first period; in response to that a second network signal condition is detected, adjust the transmission period for transmitting the sidelink synchronization signal based on a set rule to obtain a second period after the adjustment, where the second network signal condition is different from the first network signal condition, and the second period is different from the first period; and instruct a transmitter to transmit the sidelink synchronization signal to one or more second terminals according to the second period, for a Vehicle-to-Everything synchronization by the one or more second terminals based on the received sidelink synchronization signal, where the one or more second terminals are respective receiving ends for the sidelink synchronization signal and are to be synchronized with the first terminal.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Exemplary embodiments will be described in detail here with the examples thereof expressed in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when", "upon", or "in response to determining".

Figure 1:
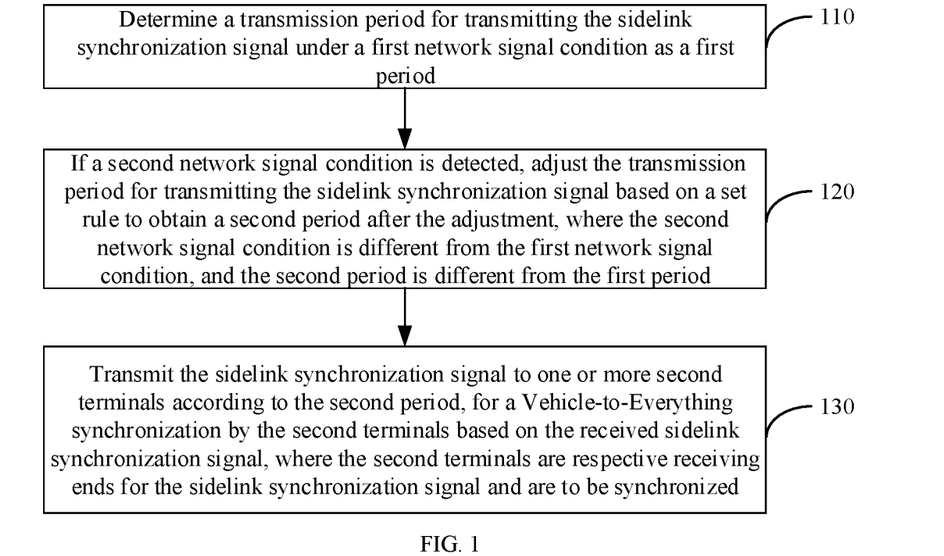
FIG. 1 is a flowchart illustrating a method of Vehicle-to-Everything synchronization according to an example.
Figure 2:
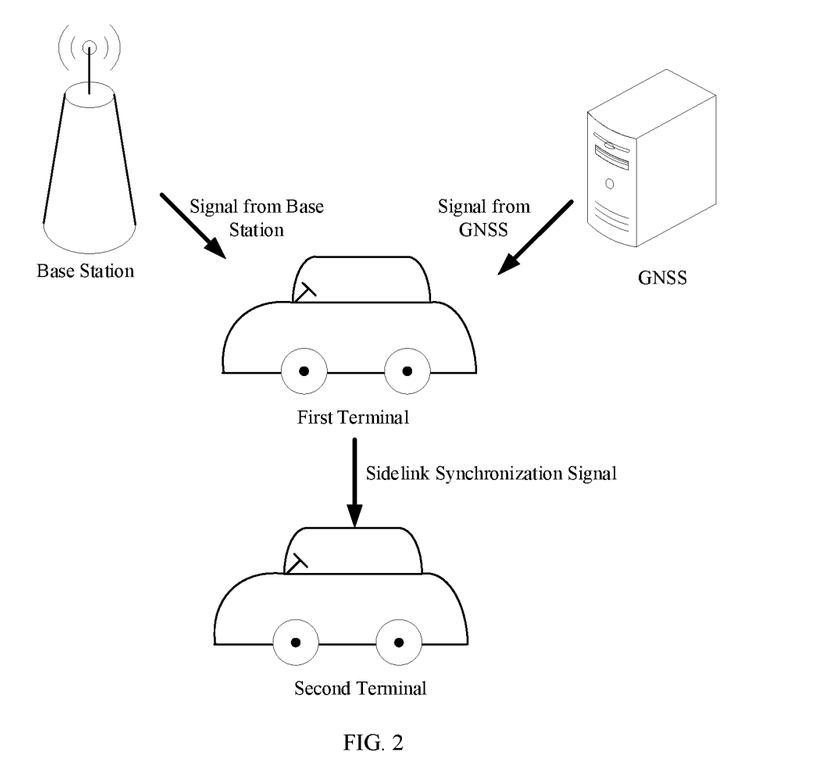
FIG. 2 is an application scenario diagram illustrating a method of Vehicle-to-Everything synchronization according to an example.

FIG. 1 is a flowchart illustrating a method of Vehicle-to-Everything synchronization according to an example, and FIG. 2 is an application scenario diagram illustrating the method of Vehicle-to-Everything synchronization according to an example. The method of Vehicle-to-Everything synchronization may be applied for a first terminal, the first terminal being a transmitting end for a sidelink synchronization signal. As illustrated in FIG. 1, the method of Vehicle-to-Everything synchronization may include the following steps 110-130.

At step 110, a transmission period for transmitting the sidelink synchronization signal under a first network signal condition is determined as a first period.

In some embodiments, a network signal may indicate a signal from a GNSS such as a Global Positioning System (GPS) signal or a Beidou signal, or a signal from a base station. In some embodiments, the first network signal condition may refer to a situation of which the network signal is relatively powerful, or may refer to a situation of which the network signal is relatively weak.

In an embodiment, the first period may be configured as a relatively large semi-static period by the first terminal under the situation of which the network signal is relatively powerful. In addition, the semi-static period may be a default transmission period for transmitting the sidelink synchronization signal for both the first terminal and the second terminals, i.e., the receiving ends for the sidelink synchronization signal, and may have a relatively large time length with a fixed value. For example: the first period is 320 milliseconds.

At step 120, if a second network signal condition is detected, the transmission period for transmitting the sidelink synchronization signal is adjusted based on a set rule to obtain a second period after the adjustment, where the second network signal condition is different from the first network signal condition, and the second period is different from the first period.

In some embodiments of the present disclosure, if the network signal changes, the transmission period for transmitting the sidelink synchronization signal changes as well.

For example, the first network signal condition refers to the situation of which the network signal is relatively powerful, and the second network signal condition refers to the situation of which the network signal is relatively weak. In this case, the transmission period for transmitting the sidelink synchronization signal may be adjusted to be smaller.

As another example, the first network signal condition refers to the situation of which the network signal is relatively weak, and the second network signal condition refers to the situation of which the network signal is relatively powerful. In this case, the transmission period for transmitting the sidelink synchronization signal may be adjusted to be larger.

At step 130, the sidelink synchronization signal is transmitted to one or more second terminals according to the second period, for a Vehicle-to-Everything synchronization by the second terminals based on the received sidelink synchronization signal, where the second terminals are respective receiving ends for the sidelink synchronization signal and are to be synchronized with the first terminal.

As illustrated in FIG. 2, a first terminal and a second terminal are included in an exemplary scenario. The first terminal is a transmitting end for a sidelink synchronization signal, and the second terminal is a receiving end for the sidelink synchronization signal. Under a first network signal condition, for example, in which signal strength of a GNSS is R1 and/or signal strength of a base station is R2, a transmission period for transmitting the sidelink synchronization signal is determined as a first period by the first terminal. When a second network signal condition that is different from the first network signal condition is detected, for example, it is detected that the signal strength of the GNSS is R3 and/or the signal strength of the base station is R4, the first terminal may adjust the transmission period for transmitting the sidelink synchronization signal based on a set rule, for example, may shorten or extend the transmission period. After the adjustment, the first terminal may obtain a second period that is different from the first period, and transmit the sidelink synchronization signal to the second terminal according to the second period. The second terminal receives the sidelink synchronization signal, and may perform the Vehicle-to-Everything synchronization based on the sidelink synchronization signal.

It can be seen that, according to the above examples, in the case that the transmission period for transmitting the sidelink synchronization signal under the first network signal condition is determined as the first period, the transmission period for transmitting the sidelink synchronization signal may be adjusted based on the set rule if the second network signal condition that is different from the first network signal condition is detected, and the second period that is different from the first period is obtained after the adjustment. The sidelink synchronization signal may be transmitted to the second terminals that are respective receiving ends for the sidelink synchronization signal according to the second period, so that the Vehicle-to-Everything synchronization is performed by the second terminals based on the received sidelink synchronization signal. Thus, it is achieved that the transmission period for transmitting the sidelink synchronization signal is adjusted based on network signal changes, which ensures to obtain a reasonable Vehicle-to-Everything synchronization effect and also saves energy consumption.

Figure 3:
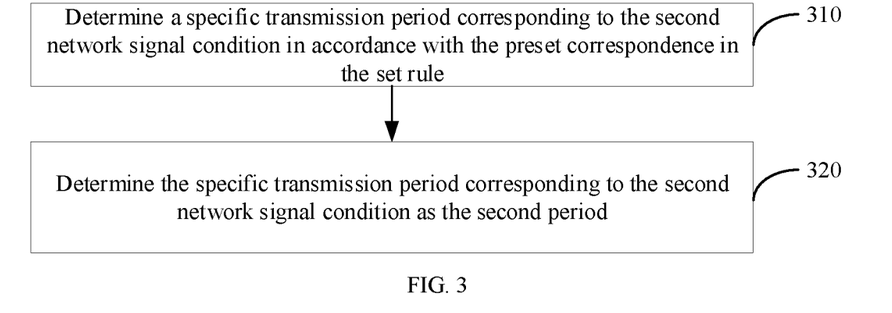
FIG. 3 is a flowchart illustrating another method of Vehicle-to-Everything synchronization according to an example.

FIG. 3 is a flowchart illustrating another method of Vehicle-to-Everything synchronization according to an example. The method of Vehicle-to-Everything synchronization is on the basis of the method illustrated in FIG. 1 and may be used for the first terminal. The set rule includes preset correspondence between specific network signal conditions and specific transmission periods. During performing the step 120, as illustrated in FIG. 3, it may include the following steps 310-320.

At step 310, a specific transmission period corresponding to the second network signal condition is determined in accordance with the preset correspondence in the set rule.

In some embodiments of the present disclosure, the preset correspondence may refer to a correspondence between different specific network signal conditions and different specific transmission periods.

For example, specific network signal condition 1 corresponds to specific transmission period 1; specific network signal condition 2 corresponds to specific transmission period 2; . . . ; specific network signal condition n corresponds to specific transmission period n.

In an embodiment, the set rule may be configured based on a communication protocol, or stored in the first terminal as a firmware.

At step 320, the specific transmission period corresponding to the second network signal condition is determined as the second period.

According to the above example, it can be seen that the specific transmission period corresponding to the second network signal condition may be determined in accordance with the preset correspondence in the set rule as the second period, thereby improving efficiency of determining the second period.

Figure 4:
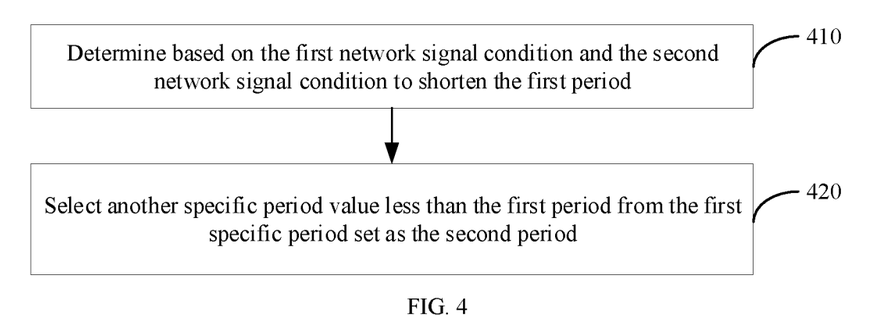
FIG. 4 is a flowchart illustrating another method of Vehicle-to-Everything synchronization according to an example.

FIG. 4 is a flowchart illustrating another method of Vehicle-to-Everything synchronization according to an example. The method of Vehicle-to-Everything synchronization is on the basis of the method illustrated in FIG. 1 and may be used for the first terminal. The first network signal condition includes at least one of the following items: the signal strength of the GNSS being greater than a first specific threshold; and, the signal strength of the base station being greater than a second specific threshold. The second network signal condition includes at least one of the following items: the signal strength of the GNSS being less than the first specific threshold; and, the signal strength of the base station being less than the second specific threshold. The set rule includes a first specific period set. In an embodiment, the set rule may be configured based on a communication protocol, or stored in the first terminal as a firmware. During performing the step 120, as illustrated in FIG. 4, it may include the following steps 410-420.

At step 410, it is determined based on the first network signal condition and the second network signal condition to shorten the first period.

In some embodiments of the present disclosure, assuming that the first network signal condition includes that the signal strength of the GNSS is greater than the first specific threshold and/or the signal strength of the base station is greater than the second specific threshold, while the second network signal condition includes that the signal strength of the GNSS is less than the first specific threshold and/or the signal strength of the base station is less than the second specific threshold, both indicate that the second network signal condition is worse than the first network signal condition. At this time, in order to ensure a better synchronization effect, the transmission period for transmitting the sidelink synchronization signal may be adjusted to be smaller, that is, the transmission period for transmitting the synchronization signal is shortened.

At step 420, another specific period value less than the first period is selected from the first specific period set as the second period.

In some embodiments of the present disclosure, the number of specific period values included in the first specific period set is generally greater than one, and less than or equal to four.

For example, the specific period values included in the first specific period set are 40 milliseconds, 80 milliseconds, 160 milliseconds, and 320 milliseconds. If the first period is 320 milliseconds, 40 milliseconds may be selected, from 40 milliseconds, 80 milliseconds and 160 milliseconds, as the second period. Similarly, 80 milliseconds or 160 milliseconds may also be selected as the second period according to actual situations.

According to the above example, it can be seen that when it is determined based on the first network signal condition and the second network signal condition to shorten the first period, another specific period value less than the first period may be selected from the first specific period set as the second period, thereby improving a reliability of determining the second period.

Figure 5:
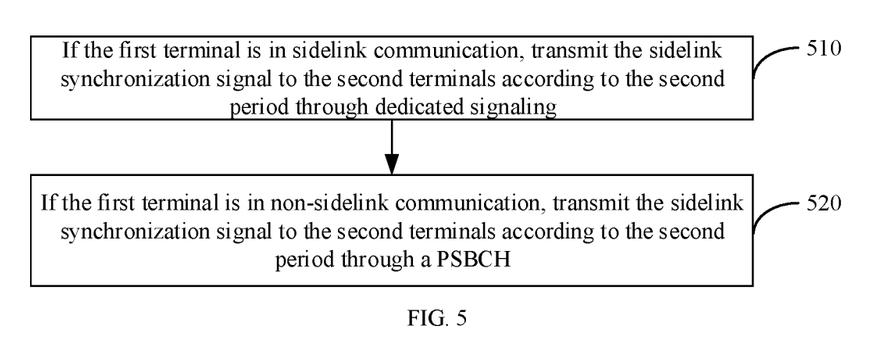
FIG. 5 is a flowchart illustrating another method of Vehicle-to-Everything synchronization according to an example.

FIG. 5 is a flowchart illustrating another method of Vehicle-to-Everything synchronization according to an example. The method of Vehicle-to-Everything synchronization is on the basis of the method illustrated in FIG. 4 and may be used for the first terminal. During performing the step 130, as illustrated in FIG. 5, it may include the following steps 510-520.

At step 510, if the first terminal is in sidelink communication, the sidelink synchronization signal is transmitted to the second terminals according to the second period through dedicated signaling.

In some embodiments of the present disclosure, being in sidelink communication may refer to that the first terminal is communicating with other directly-connected terminals.

In an embodiment, the dedicated signaling in the step 510 may include RRC signaling. In other words, if the first terminal is in sidelink communication, the sidelink synchronization signal transmitted according to the second period may be added into the RRC signaling, and then the RRC signaling may be transmitted to the second terminals, so that the second terminals may obtain, from the RRC signaling, the sidelink synchronization signal transmitted according to the second period and perform the Vehicle-to-Everything synchronization based on the sidelink synchronization signal.

At step 520, if the first terminal is in non-sidelink communication, the sidelink synchronization signal is transmitted to the second terminals according to the second period through a PSBCH.

In some embodiments of the present disclosure, being in non-sidelink communication may refer to that the first terminal is not communicating with other directly-connected terminals. In other words, if the first terminal is in non-sidelink communication, the sidelink synchronization signal may be transmitted according to the second period through the PSBCH broadcast.

According to the above example, it can be seen that the sidelink synchronization signal may be transmitted to the second terminals according to the second period through the dedicated signaling if the first terminal is in sidelink communication, and be transmitted to the second terminals according to the second period through the PSBCH if the first terminal is in non-sidelink communication, which thereby ensures a reliability of transmitting the sidelink synchronization signal and also improves efficiency of the Vehicle-to-Everything synchronization.

Figure 6:
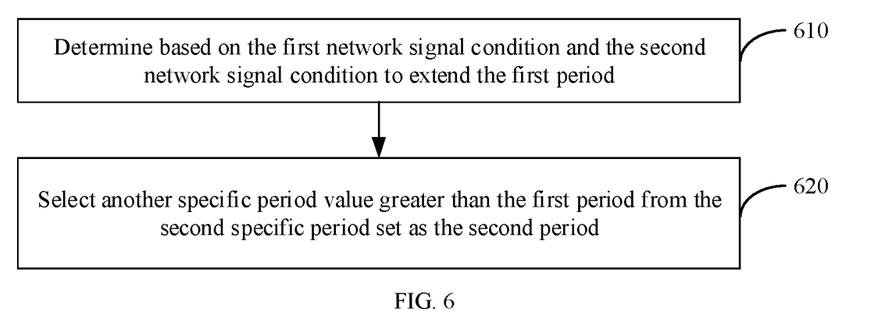
FIG. 6 is a flowchart illustrating another method of Vehicle-to-Everything synchronization according to an example.

FIG. 6 is a flowchart illustrating another method of Vehicle-to-Everything synchronization according to an example. The method of Vehicle-to-Everything synchronization is on the basis of the method illustrated in FIG. 1 and may be used for the first terminal. The first network signal condition includes at least one of the following items: the signal strength of the GNSS being less than a third specific threshold; and, the signal strength of the base station being less than a fourth specific threshold. The second network signal condition includes at least one of the following items: the signal strength of the GNSS being greater than the third specific threshold; and, the signal strength of the base station being greater than the fourth specific threshold. The set rule includes a second specific period set. In an embodiment, the set rule may be configured based on a communication protocol, or stored in the first terminal as a firmware. During performing the step 120, as illustrated in FIG. 6, it may include the following steps 610-620.

At step 610, it is determined based on the first network signal condition and the second network signal condition to extend the first period.

In some embodiments of the present disclosure, assuming that the first network signal condition includes that the signal strength of the GNSS is less than the third specific threshold and/or the signal strength of the base station is less than the fourth specific threshold, while the second network signal condition includes that the signal strength of the GNSS is greater than the third specific threshold and/or the signal strength of the base station is greater than the fourth specific threshold, both indicate that the second network signal condition is better than the first network signal condition. At this time, in order to reduce energy consumption, the transmission period for transmitting the sidelink synchronization signal may be adjusted to be larger, that is, the transmission period for transmitting the synchronization signal is extended.

At step 620, another specific period value greater than the first period is selected from the second specific period set as the second period.

In some embodiments of the present disclosure, the number of specific period values included in the second specific period set is generally greater than one, and less than or equal to four.

For example, the specific period values included in the second specific period set are 40 milliseconds, 80 milliseconds, 160 milliseconds, and 320 milliseconds. If the first period is 40 milliseconds, 320 milliseconds may be selected, from 80 milliseconds, 160 milliseconds and 320 milliseconds, as the second period. Similarly, 80 milliseconds or 160 milliseconds may also be selected as the second period according to actual situations.

According to the above example, it can be seen that when it is determined based on the first network signal condition and the second network signal condition to extend the first period, another specific period value greater than the first period may be selected from the second specific period set as the second period, thereby improving an accuracy of determining the second period.

Figure 7:
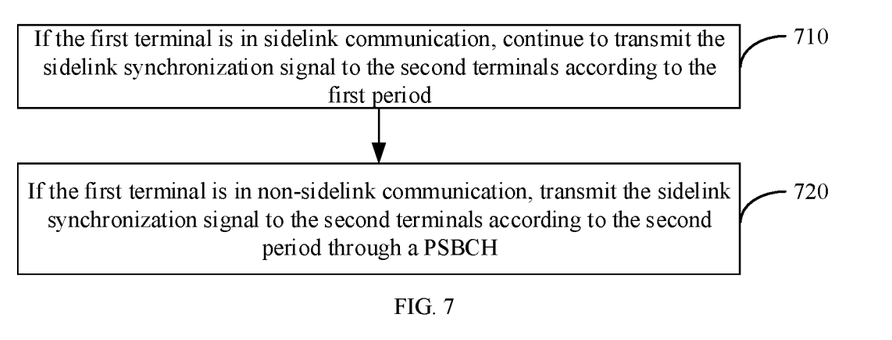
FIG. 7 is a flowchart illustrating another method of Vehicle-to-Everything synchronization according to an example.

FIG. 7 is a flowchart illustrating another method of Vehicle-to-Everything synchronization according to an example. The method of Vehicle-to-Everything synchronization is on the basis of the method illustrated in FIG. 6 and may be used for the first terminal. During performing the step 130, as illustrated in FIG. 7, it may include the following steps 710-720.

At step 710, if the first terminal is in sidelink communication, the sidelink synchronization signal continues to be transmitted to the second terminals according to the first period.

In some embodiments of the present disclosure, being in sidelink communication may refer to that the first terminal is communicating with other directly-connected terminals. In order to ensure a communication quality, if the first terminal is in sidelink communication, the sidelink synchronization signal may continue to be transmitted to the second terminals according to the first period. That is, the purpose of transmitting the sidelink synchronization signal to the second terminals according to the second period is to save link overhead when the second period is greater than the first period. However, compared with the link overhead, the communication quality is more important. Therefore, in this case, the sidelink synchronization signal may continue to be transmitted to the second terminals according to the first period until the first terminal loses its sidelink communication. At this time, if the second network signal condition remains unchanged, the sidelink synchronization signal may proceed to be transmitted to the second terminals according to the second period.

In an embodiment, the dedicated signaling in the step 710 may include RRC signaling. In other words, if the first terminal is in sidelink communication, the sidelink synchronization signal transmitted according to the first period may be added into the RRC signaling, and then the RRC signaling may be transmitted to the second terminals, so that the second terminals may obtain, from the RRC signaling, the sidelink synchronization signal transmitted according to the first period and perform the Vehicle-to-Everything synchronization based on the sidelink synchronization signal.

At step 720, if the first terminal is in non-sidelink communication, the sidelink synchronization signal is transmitted to the second terminals according to the second period through a PSBCH.

In some embodiments of the present disclosure, being in non-sidelink communication may refer to that the first terminal is not communicating with other directly-connected terminals. In other words, if the first terminal is in non-sidelink communication, the sidelink synchronization signal may be transmitted according to the second period through the PSBCH broadcast.

According to the above example, it can be seen that the sidelink synchronization signal may continue to be transmitted to the second terminals according to the first period if the first terminal is in sidelink communication, and may be transmitted to the second terminals according to the second period through the PSBCH if the first terminal is in non-sidelink communication, thereby improving a practicality of the Vehicle-to-Everything synchronization.

Corresponding to the foregoing method examples of Vehicle-to-Everything synchronization, the present disclosure also provides apparatus examples for Vehicle-to-Everything synchronization.

Figure 8:
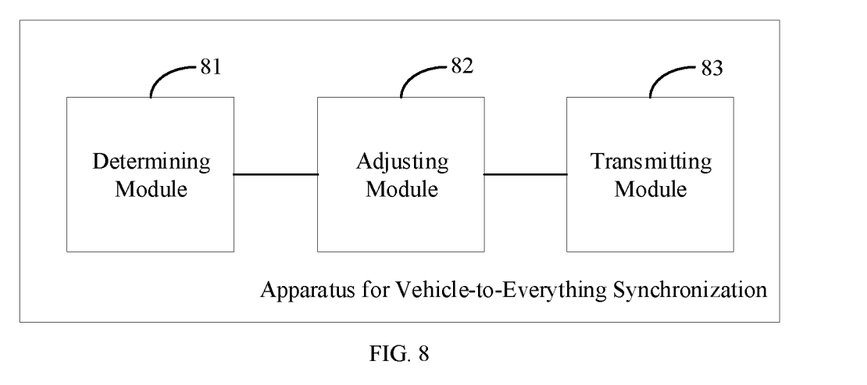
FIG. 8 is a block diagram illustrating an apparatus for Vehicle-to-Everything synchronization according to an example.

FIG. 8 is a block diagram illustrating an apparatus for Vehicle-to-Everything synchronization according to an example. The apparatus may be applied for a first terminal, the first terminal being a transmitting end for a sidelink synchronization signal, and is configured to perform the method of Vehicle-to-Everything synchronization illustrated in FIG. 1. As illustrated in FIG. 8, the apparatus for Vehicle-to-Everything synchronization may include:

a determining module 81 that is configured to determine a transmission period for transmitting the sidelink synchronization signal under a first network signal condition as a first period;

an adjusting module 82 that is configured to adjust the transmission period for transmitting the sidelink synchronization signal based on a set rule to obtain a second period after the adjustment if a second network signal condition is detected, where the second network signal condition is different from the first network signal condition, and the second period is different from the first period; and a transmitting module 83 that is configured to transmit the sidelink synchronization signal to one or more second terminals according to the second period, for a Vehicle-to-Everything synchronization by the second terminals based on the sidelink synchronization signal, where the second terminals are respective receiving ends for the sidelink synchronization signal and are to be synchronized with the first terminal.

It can be seen that, according to the above example, in the case that the transmission period for transmitting the sidelink synchronization signal under the first network signal condition is determined as the first period, the transmission period for transmitting the sidelink synchronization signal may be adjusted based on the set rule if the second network signal condition that is different from the first network signal condition is detected, and the second period that is different from the first period is obtained after the adjustment. The sidelink synchronization signal may be transmitted to the second terminals that are respective receiving ends for the sidelink synchronization signal according to the second period, so that the Vehicle-to-Everything synchronization is performed based on the received sidelink synchronization signal. Thus, it is achieved that the transmission period for transmitting the sidelink synchronization signal is adjusted based on network signal changes, which ensures to obtain a reasonable Vehicle-to-Everything synchronization effect and also saves energy consumption.

Figure 9:
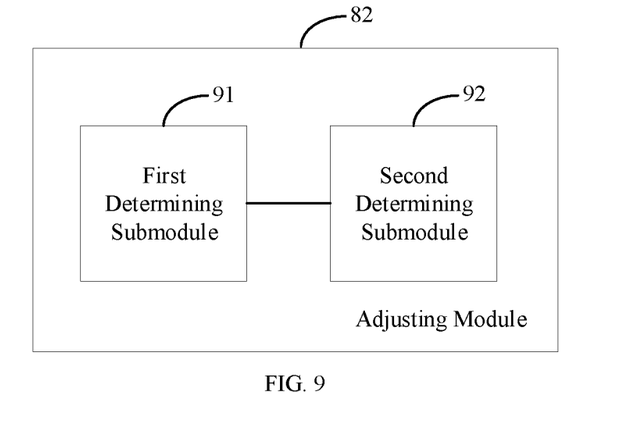
FIG. 9 is a block diagram illustrating another apparatus for Vehicle-to-Everything synchronization according to an example.

In an example as illustrated in FIG. 9, on the basis of the apparatus illustrated in FIG. 8, the set rule may include preset correspondence between specific network signal conditions and specific transmission periods. The adjusting module 82 may include:

a first determining submodule 91 that is configured to determine a specific transmission period corresponding to the second network signal condition in accordance with the preset correspondence; and a second determining submodule 92 that is configured to determine the specific transmission period corresponding to the second network signal condition as the second period.

According to the above example, it can be seen that the specific transmission period corresponding to the second network signal condition may be determined in accordance with the preset correspondence in the set rule as the second period, thereby improving efficiency of determining the second period.

In an example, on the basis of the apparatus illustrated in FIG. 8, the first network signal condition may include at least one of the following items:

signal strength of a GNSS being greater than a first specific threshold; and signal strength of a base station being greater than a second specific threshold.

In an example, on the basis of the apparatus illustrated in the above example, the second network signal condition may include at least one of the following items:

the signal strength of the GNSS being less than the first specific threshold; and the signal strength of the base station being less than the second specific threshold.

Figure 10:
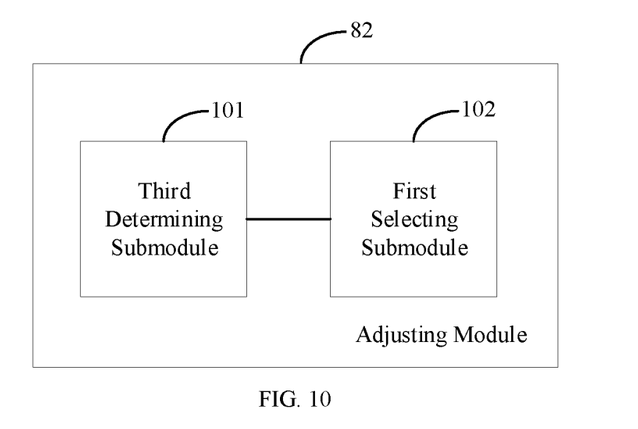
FIG. 10 is a block diagram illustrating another apparatus for Vehicle-to-Everything synchronization according to an example.

In an example illustrated in FIG. 10, on the basis of the apparatus illustrated in the above example, the set rule may include a first specific period set. The adjusting module 82 may include:

a third determining submodule 101 that is configured to determine, based on the first network signal condition and the second network signal condition, to shorten the first period; and a first selecting submodule 102 that is configured to select another specific period value less than the first period from the first specific period set, and determine said another specific period value as the second period.

According to the above example, it can be seen that when it is determined based on the first network signal condition and the second network signal condition to shorten the first period, another specific period value less than the first period may be selected from the first specific period set the second period, thereby improving a reliability of determining the second period.

Figure 11:
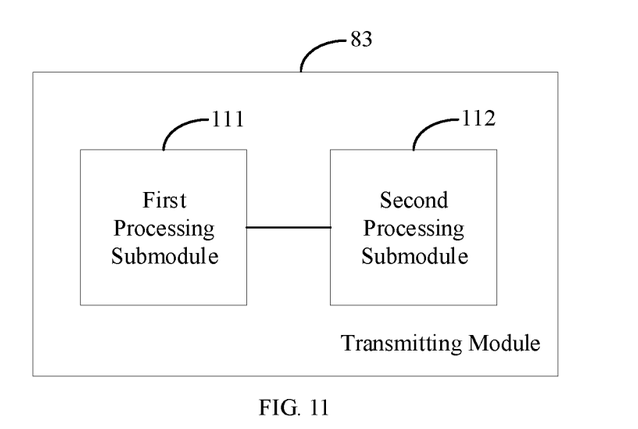
FIG. 11 is a block diagram illustrating another apparatus for Vehicle-to-Everything synchronization according to an example.

In an example illustrated in FIG. 11, on the basis of the apparatus illustrated in FIG. 10, the transmitting module 83 may include:

a first processing submodule 111 that is configured to transmit the sidelink synchronization signal to the second terminals according to the second period through dedicated signaling if the first terminal is in sidelink communication; and a second processing submodule 112 that is configured to transmit the sidelink synchronization signal to the second terminals according to the second period through a PSBCH if the first terminal is in non-sidelink communication.

According to the above example, it can be seen that the sidelink synchronization signal may be transmitted to the second terminals according to the second period through the dedicated signaling if the first terminal is in sidelink communication, and be transmitted to the second terminals according to the second period through the PSBCH if the first terminal is in non-sidelink communication, which thereby ensures a reliability of transmitting the sidelink synchronization signal and also improves efficiency of the Vehicle-to-Everything synchronization.

In an example, on the basis of the apparatus illustrated in FIG. 11, the dedicated signaling may include RRC signaling.

In an example, on the basis of the apparatus illustrated in FIG. 8, the first network signal condition may include at least one of the following items:

signal strength of a GNSS being less than a third specific threshold; and signal strength of a base station being less than a fourth specific threshold.

In an example, on the basis of the apparatus illustrated in the above example, the second network signal condition may include at least one of the following items:

the signal strength of the GNSS being greater than the third specific threshold; and the signal strength of the base station being greater than the fourth specific threshold.

Figure 12:
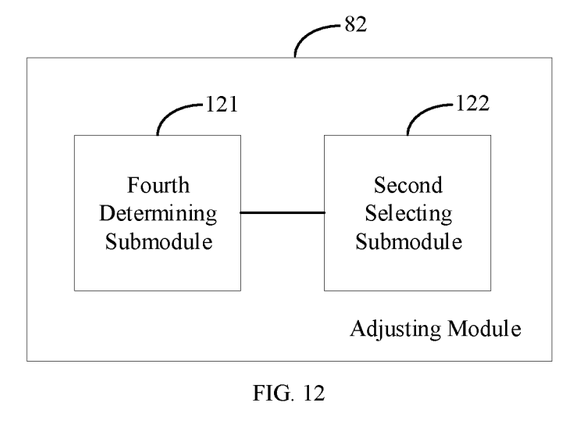
FIG. 12 is a block diagram illustrating another apparatus for Vehicle-to-Everything synchronization according to an example.

In an example illustrated in FIG. 12, on the basis of the apparatus illustrated in the above example, the set rule may include a second specific period set. The adjusting module 82 may include:

a fourth determining submodule 121 that is configured to determine, based on the first network signal condition and the second network signal condition, to extend the first period; and a second selecting submodule 122 that is configured to select another specific period value greater than the first period from the second specific period set, and determine said another specific period value as the second period.

According to the above example, it can be seen that when it is determined based on the first network signal condition and the second network signal condition to extend the first period, another specific period value greater than the first period may be selected from the second specific period set as the second period, thereby improving an accuracy of determining the second period.

Figure 13:
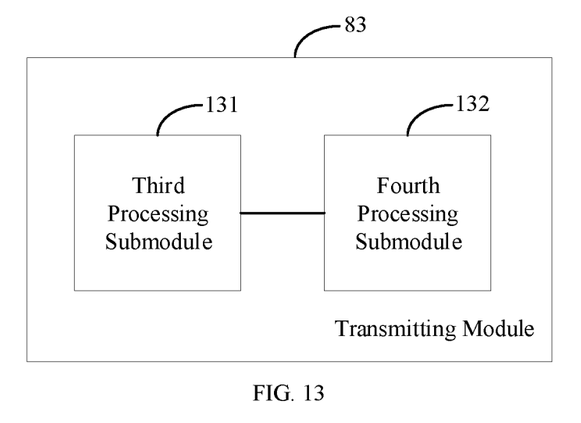
FIG. 13 is a block diagram illustrating another apparatus for Vehicle-to-Everything synchronization according to an example.

In an example illustrated in FIG. 13, on the basis of the apparatus illustrated in FIG. 12, the transmitting module 83 may include:

a third processing submodule 131 that is configured to continue to transmit the sidelink synchronization signal to the second terminals according to the first period if the first terminal is in sidelink communication; and a fourth processing submodule 132 that is configured to transmit the sidelink synchronization signal to the second terminals according to the second period through a PSBCH if the first terminal is in non-sidelink communication.

According to the above example, it can be seen that the sidelink synchronization signal may continue to be transmitted to the second terminals according to the first period if the first terminal is in sidelink communication, and may be transmitted to the second terminals according to the second period through the PSBCH if the first terminal is in non-sidelink communication, thereby improving a practicality of the Vehicle-to-Everything synchronization.

In an example, on the basis of the apparatus illustrated in FIG. 9, FIG. 10 or FIG. 12, the set rule may be configured based on a communication protocol, or stored in the first terminal as a firmware.

Since the apparatus examples essentially correspond to the method examples, reference may be made to the description of related parts of the method examples. The apparatus examples described above are merely illustrative, where the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

Accordingly, the present disclosure also provides a non-transitory computer-readable storage medium having a computer program stored thereon, and the computer program is configured to perform the method of Vehicle-to-Everything synchronization described in any one of FIGS. 1-7.

Accordingly, the present disclosure also provides an apparatus for Vehicle-to-Everything synchronization for a first terminal, the first terminal being a transmitting end for a sidelink synchronization signal. The apparatus includes:

a processor; and a memory for storing instructions executable by the processor.

The processor is configured to:

determine a transmission period for transmitting the sidelink synchronization signal under a first network signal condition as a first period;

in response to that a second network signal condition is detected, adjust the transmission period for transmitting the sidelink synchronization signal based on a set rule to obtain a second period after the adjustment, where the second network signal condition is different from the first network signal condition, and the second period is different from the first period; and instruct a transmitter to transmit the sidelink synchronization signal to one or more second terminals according to the second period, for a Vehicle-to-Everything synchronization by the second terminals based on the received sidelink synchronization signal, where the second terminals are respective receiving ends for the sidelink synchronization signal and are to be synchronized with the first terminal.

Figure 14:
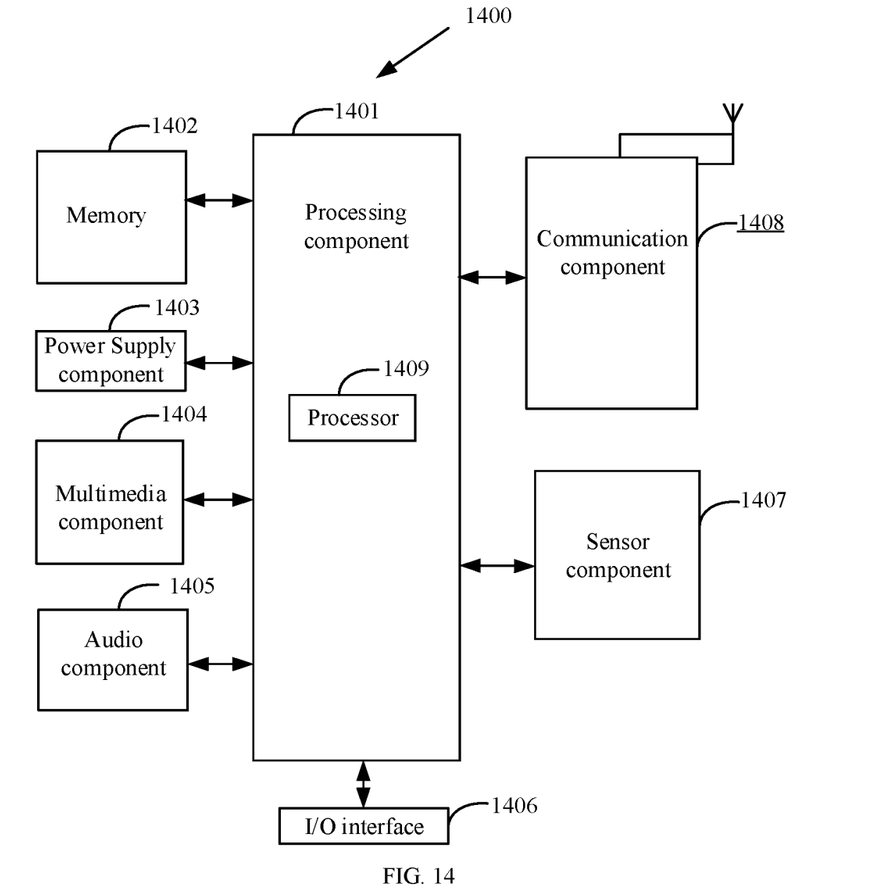
FIG. 14 is a schematic structural diagram illustrating a device for Vehicle-to-Everything synchronization according to an example.

FIG. 14 is a schematic structural diagram illustrating a device for Vehicle-to-Everything synchronization according to an example. As illustrated in FIG. 14, the device 1400 for Vehicle-to-Everything synchronization according to the example may be a terminal, such as a computer, a mobile phone, a digital broadcasting terminal, a messaging device, a game console, a tablet device, a medical device, fitness equipment, a personal digital assistant, or the like.

Referring to FIG. 14, the device 1400 may include one or more of the following components: a processing component 1401, memory 1402, a power supply component 1403, a multimedia component 1404, an audio component 1405, an input/output (I/O) interface 1406, a sensor component 1407, and a communication component 1408.

The processing component 1401 generally controls the overall operations of the device 1400, such as operations associated with display, telephone calls, data communications, camera operations, and recording operations. The processing element 1401 may include one or more processors 1409 to execute instructions to complete all or part of the steps of the above methods. In addition, the processing component 1401 may include one or more modules to facilitate interaction between the processing component 1401 and other components. For example, the processing component 1401 may include a multimedia module to facilitate the interaction between the multimedia component 1404 and the processing component 1401.

The memory 1402 is configured to store various types of data to support the operation of the device 1400. Examples of such data include instructions for any application or method operating on the device 1400, contact data, phone book data, messages, pictures, videos, and the like. The memory 1402 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power supply component 1403 provides power to various components of the device 1400. The power supply component 1403 may include a power supply management system, one or more power supplies, and other components associated with generating, managing, and distributing power for the device 1400.

The multimedia component 1404 includes a screen providing an output interface between the device 1400 and a user. In some embodiments, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 1404 includes a front camera and/or a rear camera. The front camera and/or rear camera may receive external multimedia data when the device 1400 is in an operating mode, such as a photographing mode or a video mode. Each front camera and rear camera may be a fixed optical lens system or have focal length and optical zooming capability.

The audio component 1405 is configured to output and/or input an audio signal. For example, the audio component 1405 includes a microphone (MIC) that is configured to receive an external audio signal when the device 1400 is in an operation mode, such as a call mode, a recording mode, and a voice recognition mode. The received audio signal may be further stored in the memory 1402 or sent via the communication component 1408. In some embodiments, the audio component 1405 also includes a speaker for outputting an audio signal.

The I/O interface 1406 provides an interface between the processing component 1401 and a peripheral interface module. The above peripheral interface module may be a keyboard, a click wheel, buttons, or the like. These buttons may include but not limited to, a home button, a volume button, a start button and a lock button.

The sensor component 1407 includes one or more sensors for providing the device 1400 with status assessment in various aspects. For example, the sensor component 1407 may detect an open/closed state of the device 1400 and a relative positioning of components such as the display and keypad of the device 1400, and the sensor component 1407 may also detect a change in position of the device 1400 or a component of the device 1400, the presence or absence of user contact with the device 1400, orientation or acceleration/deceleration of the device 1400, and temperature change of the device 1400. The sensor component 1407 may include a proximity sensor configured to detect the presence of a nearby object without any physical contact. The sensor component 1407 may further include an optical sensor, such as a Complementary Metal-Oxide-Semiconductor (CMOS) or Charged Coupled Device (CCD) image sensor which is used in imaging applications. In some embodiments, the sensor component 1407 may also include an acceleration sensor, a gyro sensor, a magnetic sensor, a pressure sensor, or a temperature sensor.

The communication component 1408 is configured to facilitate wired or wireless communication between the device 1400 and other devices. The device 1400 may access a wireless network based on a communication standard, such as Wi-Fi, 2G, 3G, or a combination thereof. In an embodiment, the communication component 1408 receives broadcast signals or broadcast related information from an external broadcast management system via a broadcast channel. In an embodiment, the communication component 1408 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Blue Tooth (BT) technology and other technologies.

In some embodiments, the device 1400 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In some embodiments, there is also provided a non-transitory computer-readable storage medium including instructions, such as the memory 1402 including instructions executable by the processor 1409 of the device 1400 to implement the above methods. For example, the non-transitory computer-readable storage medium may be a ROM, a random access memory (RAM), a CD-ROM, a magnetic tape, a floppy disk, an optical data storage device, and the like.

When instructions in the storage medium are executed by the processor, the device 1400 can execute any one of the methods of Vehicle-to-Everything synchronization described above.

It should be understood that the present disclosure is not limited to the above described accurate structures illustrated in the drawings, and various modifications and changes can be made to the present disclosure without departing from the scope thereof. The scope of the present disclosure is to be limited only by the appended claims.

The invention claimed is:

1. A method of Vehicle-to-Everything synchronization for a first terminal, comprising:
   determining, by the first terminal, a transmission period for transmitting the sidelink synchronization signal under a first network signal condition as a first period, wherein the first terminal is a transmitting end for a sidelink synchronization signal;
   in response to that a second network signal condition is detected, adjusting, by the first terminal, the transmission period for transmitting the sidelink synchronization signal based on a set rule to obtain a second period after the adjustment, wherein the second period is smaller than the first period in the case that signal strength of a network signal in the second network signal condition is less than signal strength of the network signal in the first network signal condition, and the second period is larger than the first period in the case that signal strength of the network signal in the second network signal condition is greater than signal strength of the network signal in the first network signal condition; and transmitting, by the first terminal, the sidelink synchronization signal to one or more second terminals according to the second period, for a Vehicle-to-Everything synchronization by the one or more second terminals based on the received sidelink synchronization signal, wherein the one or more second terminals are respective receiving ends for the sidelink synchronization signal and are to be synchronized with the first terminal.

2. The method according to claim 1, wherein the set rule comprises preset correspondence between specific network signal conditions and specific transmission periods; and
wherein adjusting the transmission period for transmitting the sidelink synchronization signal based on the set rule to obtain the second period after the adjustment comprises:
determining a specific transmission period corresponding to the second network signal condition in accordance with the preset correspondence; and
determining the specific transmission period corresponding to the second network signal condition as the second period.

3. The method according to claim 1, wherein the first network signal condition comprises at least one of:
signal strength of a Global Navigation Satellite System (GNSS) being greater than a first specific threshold; or
signal strength of a base station being greater than a second specific threshold.

4. The method according to claim 3, wherein the second network signal condition comprises at least one of:
the signal strength of the GNSS being less than the first specific threshold; or
the signal strength of the base station being less than the second specific threshold.

5. The method according to claim 4, wherein the set rule comprises a first specific period set; and
wherein adjusting the transmission period for transmitting the sidelink synchronization signal based on the set rule to obtain the second period after the adjustment comprises:
determining, based on the first network signal condition and the second network signal condition, to shorten the first period; and
selecting a specific period value less than the first period from the first specific period set as the second period.

6. The method according to claim 5, wherein transmitting the sidelink synchronization signal to one or more second terminals according to the second period comprises:
in response to that the first terminal is in sidelink communication, transmitting, through dedicated signaling, the sidelink synchronization signal to the one or more second terminals according to the second period; and
in response to that the first terminal is in non-sidelink communication, transmitting, through a physical sidelink broadcast channel (PSBCH), the sidelink synchronization signal to the one or more second terminals according to the second period.

7. The method according to claim 6, wherein the dedicated signaling comprises radio resource control (RRC) signaling.

8. The method according to claim 1, wherein the first network signal condition comprises at least one of:
signal strength of a GNSS being less than a third specific threshold; or
signal strength of a base station being less than a fourth specific threshold.

9. The method according to claim 8, wherein the second network signal condition comprises at least one of:
the signal strength of the GNSS being greater than the third specific threshold; or
the signal strength of the base station being greater than the fourth specific threshold.

10. The method according to claim 9, wherein the set rule comprises a second specific period set; and
wherein adjusting the transmission period for transmitting the sidelink synchronization signal based on the set rule to obtain the second period after the adjustment comprises:
determining, based on the first network signal condition and the second network signal condition, to extend the first period; and
selecting a specific period value greater than the first period from the second specific period set as the second period.

11. The method according to claim 10, wherein transmitting the sidelink synchronization signal to one or more second terminals according to the second period comprises:
in response to that the first terminal is in sidelink communication, continuing to transmit the sidelink synchronization signal to the one or more second terminals according to the first period; and
in response to that the first terminal is in non-sidelink communication, transmitting, through a PSBCH, the sidelink synchronization signal to the one or more second terminals according to the second period.

12. The method according to claim 1, wherein the set rule is configured based on a communication protocol, or stored in the first terminal as a firmware.

13. A non-transitory computer-readable storage medium having a computer program stored thereon, wherein the computer program is configured to perform:
determining, by the first terminal, a transmission period for transmitting the sidelink synchronization signal under a first network signal condition as a first period, wherein the first terminal is a transmitting end for a sidelink synchronization signal;
in response to that a second network signal condition is detected, adjusting, by the first terminal, the transmission period for transmitting the sidelink synchronization signal based on a set rule to obtain a second period after the adjustment, wherein the second period is smaller than the first period in the case that signal strength of a network signal in the second network signal condition is less than signal strength of the network signal in the first network signal condition, and the second period is larger than the first period in the case that signal strength of the network signal in the second network signal condition is greater than signal strength of the network signal in the first network signal condition; and
transmitting, by the first terminal, the sidelink synchronization signal to one or more second terminals according to the second period, for a Vehicle-to-Everything synchronization by the one or more second terminals based on the received sidelink synchronization signal, wherein the one or more second terminals are respective receiving ends for the sidelink synchronization signal and are to be synchronized with the first terminal.

14. An apparatus for Vehicle-to-Everything synchronization for a first terminal, the first terminal being a transmitting end for a sidelink synchronization signal, comprising:
a processor; and a memory for storing instructions executable by the processor;

wherein the processor is configured to:

determine a transmission period for transmitting the sidelink synchronization signal under a first network signal condition as a first period;

in response to that a second network signal condition is detected, adjust the transmission period for transmitting the sidelink synchronization signal based on a set rule to obtain a second period after the adjustment, wherein the second period is smaller than the first period in the case that signal strength of a network signal in the second network signal condition is less than signal strength of the network signal in the first network signal condition, and the second period is larger than the first period in the case that signal strength of the network signal in the second network signal condition is greater than signal strength of the network signal in the first network signal condition; and instruct a transmitter to transmit the sidelink synchronization signal to one or more second terminals according to the second period, for a Vehicle-to-Everything synchronization by the one or more second terminals based on the received sidelink synchronization signal, wherein the one or more second terminals are respective receiving ends for the sidelink synchronization signal and are to be synchronized with the first terminal.

15. The apparatus according to claim 14, wherein the set rule comprises preset correspondence between specific network signal conditions and specific transmission periods; and wherein the processor configured to adjust the transmission period of transmitting the sidelink synchronization signal based on the set rule to obtain the second period after the adjustment is further configured to:

determine a specific transmission period corresponding to the second network signal condition in accordance with the preset correspondence; and determine the specific transmission period corresponding to the second network signal condition as the second period.

16. The apparatus according to claim 14, wherein the first network signal condition comprises at least one of:

signal strength of a Global Navigation Satellite System (GNSS) being greater than a first specific threshold; or signal strength of a base station being greater than a second specific threshold.

17. The apparatus according to claim 16, wherein the second network signal condition comprises at least one of:

the signal strength of the GNSS being less than the first specific threshold; or the signal strength of the base station being less than the second specific threshold.

18. The apparatus according to claim 14, wherein the first network signal condition comprises at least one of:

signal strength of a GNSS being less than a third specific threshold; or signal strength of a base station being less than a fourth specific threshold.

19. The apparatus according to claim 18, wherein the second network signal condition comprises at least one of:

the signal strength of the GNSS being greater than the third specific threshold; or the signal strength of the base station being greater than the fourth specific threshold.

20. The apparatus according to claim 14, wherein the set rule is configured based on a communication protocol, or stored in the first terminal as a firmware.

\* \* \* \* \*